United States Patent [19]
Honma

[11] Patent Number: 5,661,713
[45] Date of Patent: Aug. 26, 1997

[54] OPTICAL INFORMATION REPRODUCING APPARATUS WITH A THRESHOLD LEVEL GENERATOR TO ELIMINATE DC LEVEL FLUCTUATION

[75] Inventor: Hiromi Honma, Tokyo, Japan

[73] Assignee: NEC Corporation, Tokyo, Japan

[21] Appl. No.: 562,060

[22] Filed: Nov. 22, 1995

[30] Foreign Application Priority Data

Nov. 22, 1994 [JP] Japan .................................. 6-287678

[51] Int. Cl.$^6$ .............................. G11B 7/00; G11B 20/10
[52] U.S. Cl. ............................ 369/124; 369/59; 369/107; 369/13
[58] Field of Search .............................. 369/124, 59, 54, 369/13, 32, 107

[56] References Cited

U.S. PATENT DOCUMENTS

| | | | |
|---|---|---|---|
| 5,101,395 | 3/1992 | Cardero et al. | 369/59 |
| 5,313,450 | 5/1994 | Nishiwaki et al. | 369/124 |
| 5,359,586 | 10/1994 | Izumi et al. | 369/59 |
| 5,420,484 | 5/1995 | Kawakubo et al. | 369/59 |
| 5,548,570 | 8/1996 | Hirajima et al. | 369/59 |

Primary Examiner—Georgia Y. Epps
Assistant Examiner—Kim-Kwok Chu
Attorney, Agent, or Firm—Foley & Lardner

[57] ABSTRACT

A level sensor circuit compares a threshold level from a threshold value generator circuit with that of an input sampling signal to create a binarized pulsated signal. A change point detector circuit detects a change point of binary information indicated by the input pulsates signal or positions before and after the change point and thereby sends a change point detection signal(s) to a threshold level generator circuit. The threshold level generator circuit extracts from the sampling signals only ones at points of time when the change point detection signal is inputted from the change point detector circuit and then averages the extracted sampling signals with respect to time to generate a threshold level.

10 Claims, 12 Drawing Sheets

REPETITIOUS PATTERN: 1100000000

REPETITIOUS PATTERN: 110000000

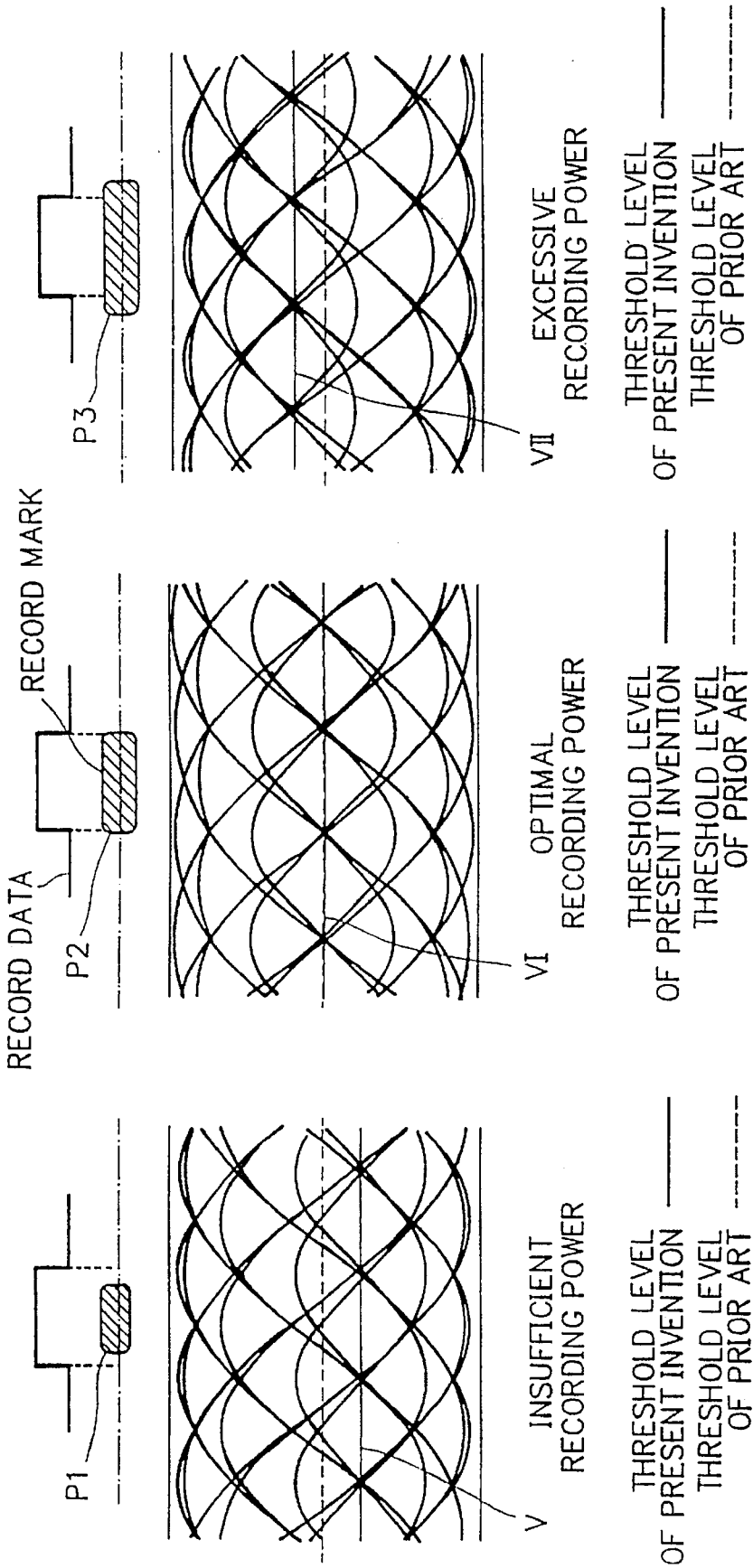

OPTICAL INFORMATION REPRODUCING APPARATUS WITH A THRESHOLD LEVEL GENERATOR TO ELIMINATE DC LEVEL FLUCTUATION

BACKGROUND OF THE INVENTION

The present invention relates to a reproducing apparatus for optical information recording media and, in particular, to a reproducing apparatus for optical information recording media for reproducing by an optical head signals beforehand recorded on optical information recording media in a mark edge recording method.

1. Description of the Related Art

When recording information on optical information recording media from which information recorded thereon (represented by beforehand recorded signals) is reproduced by optical means, there is employed a method called a mark position recording method for the recording media of the standardized first generation as shown in FIG. 1.

In the mark position recording method, intensity of a recording laser beam is modulated by non-return-to-zero (NRZ) signals ((B) in FIG. 1), corresponding to codes of series Y ((A) in FIG. 1) attained by modulating the recorded information so as to form record marks on the recording media as shown by (c) in FIG. 1.

In the reproduction of the signals thus recorded on the recording media, a laser beam is illuminated thereonto by an optical head to sense changes in the light intensity or polarization plane of light reflected on the media. The changes are then converted from optical information into electrical information to reproduce a signal R of (D) in FIG. 1. In the reproducing apparatus, the reproduced signal R is differentiated to obtain a signal shown by (E) in FIG. 1 so as to produce a mark position sense signal shown by (F) in FIG. 1.

In contrast therewith, there has been heretofore known a recording method which improves the recording density and which is called a mark edge recording method as shown in FIG. 2.

In the mark edge recording method, codes of series Y ((A) in FIG. 2) obtained by modulating the recorded information is subjected to an NRZI modulation to create a pulse series Z of (B) in FIG. 2. Light intensity of the recording laser beam is modulated by the pulse series Z to from on the optical information recording media recording marks in which the leading an trailing edges each correspond to code "1" as shown by (c) in FIG. 2.

When reproducing the signals thus recorded on the media, a laser beam is illuminated thereonto by an optical head to detect changes in the light intensity or polarization plane of light reflected on the media. The changes are then subjected to an opto-electric conversion to generate a reproduced signal R of (D) in FIG. 2. In the reproducing apparatus, the reproduced signal R is compared with a threshold level I to produce a detection signal including a pulse series Z shown by (E) in FIG. 2.

In accordance with the mark edge recording method, since the leading and trailing edges of a record mark each correspond to "1" in series Y, the recording density is approximately doubled for the same recording mark length when compared with the mark position recording method in which a record mark is created for each "1" of series Y.

However, in the reproducing apparatus of the mark position recording method, the record mark positions are detected according to differential signals and hence the apparatus is stable against changes in a direct-current (dc) component of the reproduced signal. In contrast therewith, in the reproducing apparatus operating in the mark edge recording method, the record marks are sensed by achieving the level comparison between the reproduced signals and the threshold level as shown by (D) in FIG. 2. Consequently, there is increased the chance of read errors due to the dc fluctuation in the reproduced signal.

In consequence, when achieving a signal recording and reproduction in the mark edge recording method suitable for a higher recording density by an optical head, it is essential to set a threshold level for the binarization of reproduced signals. In the optical information recording media of the first generation, there occasionally exists media which is unavailable because an ideal record pit contour cannot be formed due to a characteristic thereof. However, thanks to the recent improvement of the media and the record compensation technology, the edge shift has been reduced.

However, when an alternating-current (ac) amplifier is adopted in place of an expensive low-noise wide-band dc amplifier, since there may be missing dc-free codes to be recorded with a high density, the dc fluctuation becomes conspicuous in the leading portions of sectors constituting a code file. Moreover, when using such media having birefringence as a polycarbonate substrate, there appears a dc fluctuation up to about 10 kHz relative to the direct current in the circumferential direction of the disk, resulting in increase of data read errors. As above, it is to be appreciated that the data read errors may frequently take place due to the dc fluctuation.

FIG. 3 shows in a block diagram an example of the conventional reproducing apparatus for optical information recording media provided with a countermeasure against the dc fluctuation. In the diagram, a reproduced signal obtained from the media by the optical head is directly supplied via an input terminal 30 to a comparator 32. On the other hand, the signal is fed to a low-pass filter (LPF) 31 so as to extract a dc component from the signal. The dc component is then fed to the comparator 32.

In the comparator 32, the dc component outputted from the low-pass filter 31 is used as a threshold level for the level comparison of a reproduced signal inputted thereto. A series of binarized pulses obtained according to the result of comparison is outputted as a sense signal to an output terminal 33. Resultantly, there is attained from the conventional apparatus a sense signal from which the influence of the dc fluctuation has been removed.

FIG. 4 is a block diagram showing another example of the conventional reproducing apparatus for optical information recording media provided with a countermeasure against the dc fluctuation. In the diagram, a reproduced signal obtained from the media by the optical head is fed via an input terminal 30 to an amplifier to be amplified therein. The amplified signal is then delivered to a mean value circuit 37. From the circuit 37, a signal corresponding to a mean value of the maximum and minimum values of the reproduced signals inputted to the apparatus is fed to a sample and hold (S/H) circuit 38. Moreover, the reproduced signal outputted from the amplifier 36 is directly delivered to a comparator 32.

The sample and hold circuit 38 samples, according to a preamble gate signal inputted via an input terminal 35 thereto, a signal outputted from the mean value circuit 37 during a preamble field reproducing period of the media. In other field reproducing period, the signal sampled and held therein is supplied as a threshold level to the comparator 32.

In the comparator 32, the threshold level is compared with the reproduced signal so as to output a detection signal corresponding to the dc fluctuation to an output terminal 33.

According to the conventional apparatus described above, the threshold level also follows with respect to time as indicated by II the reproduction signal having an envelope with an dc fluctuation shown by (B) in FIG. 5, thereby absorbing the dc fluctuation. In this regard, (A) in FIG. 5 shows an eye pattern of a reproduced signal in which the dc fluctuation is missing.

However, as can be seen from the pattern of the reproduced signal of FIG. 14, the resolution is decreased due to the high-density recording. Additionally, in the reproduction of a particular pattern with a dc component, since the threshold level is obtained by integrating the reproduced waveform in the conventional reproducing apparatus of FIG. 3, the threshold level is shifted downward from the optimal value as indicated by a dotted line III in FIG. 14 and hence the error occurrence probability is increased. Furthermore, in the conventional reproducing apparatus of FIG. 4, the threshold level, which is the mean value of the maximum and minimum values, is obtained as denoted by a dotted line III in FIG. 14, namely, below the optimal value, and hence it is impossible to carry out a satisfactory reproducing operation.

In addition, in case where information is recorded according to the direction of magnetization of a magnetic film of the optical information recording media, when the film of which the direction of magnetization is beforehand fixedly aligned in the information recording operation is applied to a recording method in which the film is locally heated by a laser beam according to information to control the direction of magnetization to a direction (opposite to that beforehand aligned) corresponding to a bias magnetic field externally applied to the media, the length of each record mark for record data varies depending, for example, on the change in power of the light source in the information recording operation using the optical modulation and on the change in environmental conditions as shown in FIG. 15.

Namely, in (A) of FIG. 15 showing the case of an insufficient recording power, the length P1 of a record mark becomes shorter when compared with record data. In (B) of FIG. 15 presenting the case of an optimal recording power, the length P2 of a record mark appropriately corresponds to the record data. Furthermore, in (C) of FIG. 15 designating a case of an excessive recording power, the record mark length P3 is longer than the record data.

In the conventional apparatus, also for any information recording media in which record marks are formed, the position of patterns respectively corresponding to the maximum recording frequencies are shifted upward or downward and hence the eye pattern symmetry of reproduced signals is destroyed as shown by (A) to (C) in FIG. 15. However, the threshold level designated by a dotted line in (A) to (C) of FIG. 15 is in the vicinity of the central point between the maximum and minimum values of reproduced signals in either cases. Therefore, particularly, in the conventional apparatus shown in FIG. 4, the threshold level is shifted from the optimal threshold level, leading to a problem of increase in the error rate in the information reproduction.

SUMMARY OF THE INVENTION

It is therefore an object of the present invention, which has been developed in consideration of the problem above, to provide a reproducing apparatus for optical information recording media, particularly, for optical information recording media with information recorded thereon in a mark edge recording method in which there is generated a threshold appropriately following a dc fluctuation in reproduced signals, thereby satisfactorily reproducing beforehind recorded information.

Another object of the present invention is to provide a reproducing apparatus for optical information recording media capable of reliably reproducing patterns in an address area and a flag area of a leading portion of a sector of the media, the patterns including particular patterns in a successive manner and a lot of dc components.

Still another object of the present invention is to provide a reproducing apparatus for optical information recording media capable of satisfactorily restoring reproduced signals of which the reproduction eye pattern is asymmetric due to deviation in length of record marks.

In accordance with the present invention, there is provided a reproducing apparatus for optical recording media including a sample and hold circuit for sampling and holding a reproduced signal obtained by reproducing by an optical head information recorded, on optical information recording media in a mark edge recording method, a level sensor circuit for comparing a level of a sampling signal outputted from the sample and hold circuit with that Of a threshold level and producing a binarized pulsated signal, a change point detector circuit for receiving the pulsated signal as an input signal thereto, detecting a position of a change point where "0" or "1" of binary information changes respectively into "1" or "0", or positions before and after the change point, and generating a timing signal or timing signals showing the position of the change point or the positions before and after the change point as a change point detection signal or change point detection signals, respectively, and a threshold level generator circuit for receiving as iaput signals thereto the sampling signal outputted from the sample and hold circuit and the change point detection signal outputted from the change point detector circuit, extracting from the sampling signals only ones at points of time when the change point detection signal indicates detection of a change point, averaging the extracted sampling signals with respect to time to thereby create the threshold level, and outputting the threshold level to the level sensor circuit.

In the optical head of the reproducing apparatus, a laser beam from a light source thereof is focused via an objective lens onto the media to form an optical spot thereon. Thereafter, light reflected thereon is received via the objective by a predetermined optical system. In this situation, the radius of the optical spot is decided according to the wavelength of the laser beam and the numerical aperture of the objective. Consequently, when the recording density is increased up to the vicinity of the radius in the reading of a mark, information in the neighborhood thereof is also obtained as an interference component due to an intersymbol interference.

Resultantly, before and after the code change point, the amplitude is lowered and the margin thereof is reduced. In the ordinary level detection method, when the resolution is decreased due to the increase in density, the occurrence of errors is increased in the data restoration of reproduced signals having a low amplitude level. Therefore, by determining an optimal threshold level from the reproduction signals of the pattern in which errors occur most frequently, it is possible to reduce the overall errors. A sample point at which the amplitude margin takes a minimum value is a position where the intersymbol interference most frequent occurs, Namely, there are attained the points before and after the code change point.

In accordance with the present invention, a code change position or the positions before and after the change point is or are detected by a change point detecting circuit in consideration of the fact above. Using a threshold level generator, only the sampling signals (at the sample points) before and after the change point are extracted to calculate a mean value as the threshold level. In consequence, the dc fluctuation and asymmetry of the eye pattern can be sufficiently compensated for.

Particularly, for the random data of (1,7)NRZ modulation, the sample values before and after the code change point occupy at least 60% of the overall data value. Consequently, most errors occurring due to the decrease in resolution are related to the data of the sample values. In this case, therefore, the error rate can be remarkably lowered by minimizing the level detection errors caused by the dc deviation.

In this connection, when the reproduced signal to be fed to the sample and hold circuit is attained by reproducing by an optical head information beforehand recorded in a preformatted area of optical information recording media, the influence of the level discrepancy between the reproduction signal of the preformatted area and that of the record area on the threshold level generation can be prevented by providing selecting means between the threshold generator and the level detector, the selecting means selecting the threshold level created by the threshold level generator during the record area reproduction and a predetermined constant as the threshold level during the preformatted area reproduction.

BRIEF DESCRIPTION OF THE DRAWINGS

The objects and features of the present invention will become more apparent from the consideration of the following detailed description taken in conjunction with the accompanying drawings in which:

FIGS. 15(A)–15(C) are diagrams showing a threshold level for an offset in association with a recording power in accordance with the present invention and the prior art.

DESCRIPTION OF THE PREFERRED EMBODIMENTS

Figure 6:
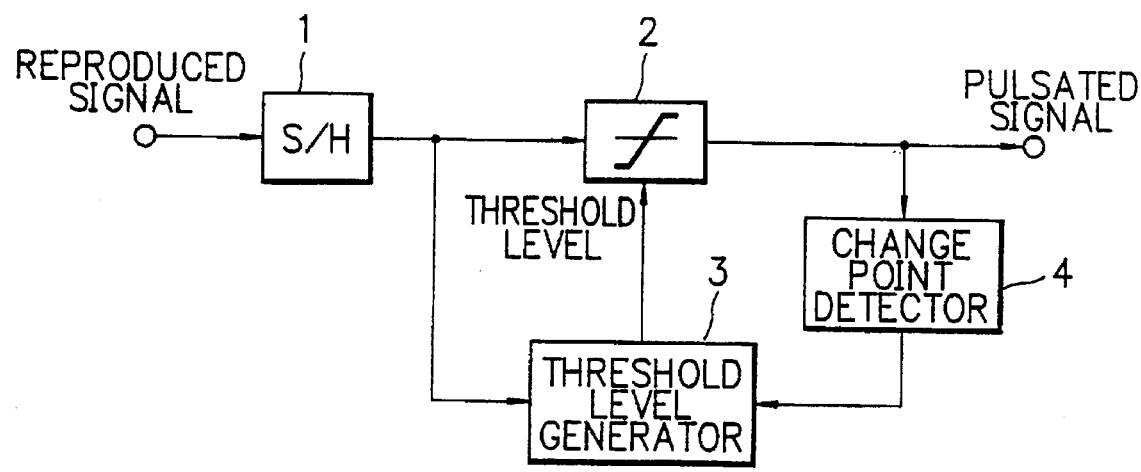
FIG. 6 is a block diagram showing the configuration of a first embodiment of the reproducing apparatus in accordance with the present invention.

Next, description will be given embodiments of the reproducing apparatus in accordance with the present invention. FIG. 6 shows a first embodiment of the reproducing apparatus in accordance with the present invention. The embodiment includes a sample and hold circuit 1, a level sensor or detector circuit 2, a threshold generator circuit 3, and a change point detector circuit 4.

In the first and subsequent embodiments, there is employed, for example, an optical disk as the optical information recording media to reproduce information recorded thereon. In the optical disk, information is recorded as the change in the direction of magnetization. An optical head of the reproducing apparatus irradiates onto the disk a laser beam having a fixed light intensity at an intensity level not causing the inversion of magnetization. A polarization plane of light reflected on the disk rotates according to the directions of magnetization for records. Consequently, the change of the polarization plane of reflected light is sensed as alteration in the quantity of light. The obtained alteration in the light quantity is transformed from optical information into electrical information to thereby attain a reproduced signal.

The sample and hold circuit 1 receives as an input signal the reproduced signal obtained by the optical head of the known configuration and conducts a sample and hold operation for the signal. The level sensor 2 compares the level of a threshold level with that of the signal produced from the sample and hold circuit 1 to generate binarized signals (pulsated signals). The threshold level generator 3 receives as inputs thereto the signals from the sample and hold circuit 1 and a change point detector 4 to produce a threshold level to be fed to the level sensor 2. The change point detector receives as input thereto the pulsated signals to thereby detect a change point of binary information or positions before and after the change point.

Subsequently, operation of the embodiment will be described. A reproduced signal obtained from the optomagnetic disk by an optical head, not shown, is supplied to the sample and hold circuit 1. According to a sampling clock of a predetermined frequency created in relation to the reproduced signal, the sample and hold operation is repeatedly carried out for the reproduced signal to attain a sampling signal. The signal is delivered to the level sensor 2 and threshold level generator 3.

The level sensor 2 compares the threshold level from the threshold level generator, which will be described later, with that of the inputted sampling signal to produce a binarized pulsated signal and then feeds the signal to a subsequent stage as well as the change point detector 4. According to the binary information indicated by the pulsated signal, the detector 4 detects the position of a change point of the binary information or the positions before and after the change point and then supplies a change point detection signal(s) to the threshold level generator 3.

Figure 1:
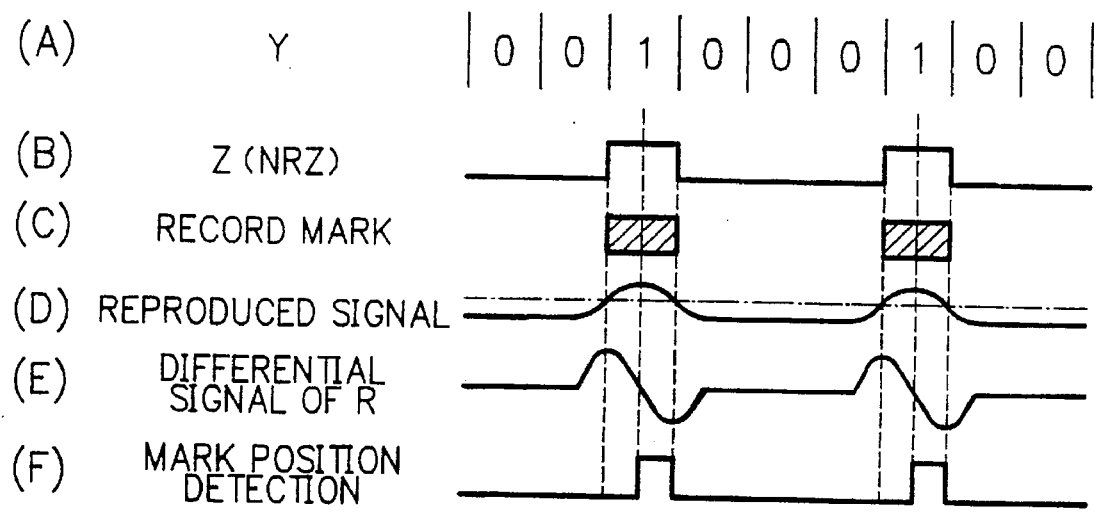
FIGS. 1(A)–1(F) are diagrams for explaining the signal recording and reproduction in the mark position recording method.
Figure 2:
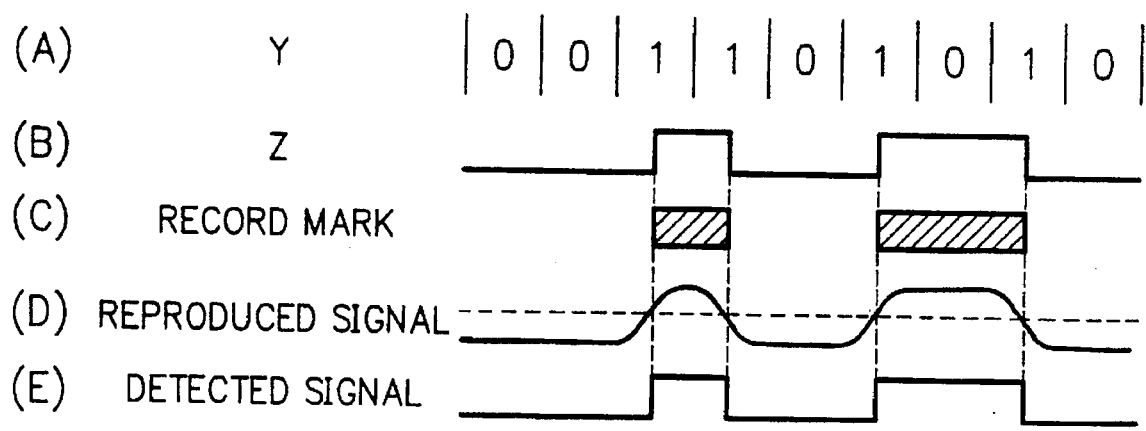
FIGS. 2(A)–2(E) are diagrams for explaining the signal recording and reproduction in the mark edge recording method.
Figure 3:
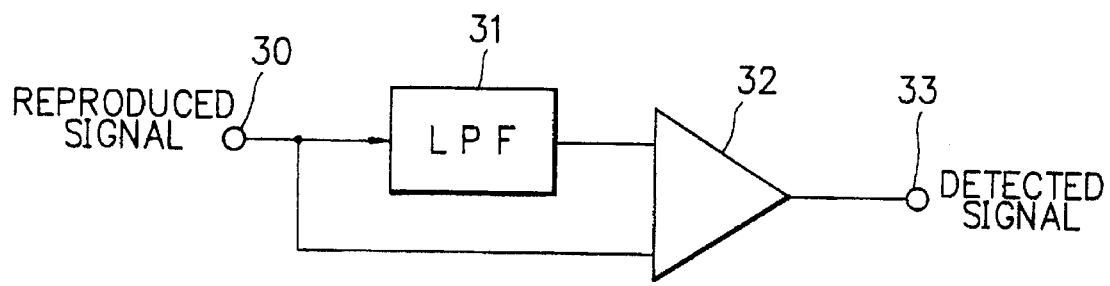
FIG. 3 is a block diagram showing constitution of an example of the conventional apparatus.
Figure 4:
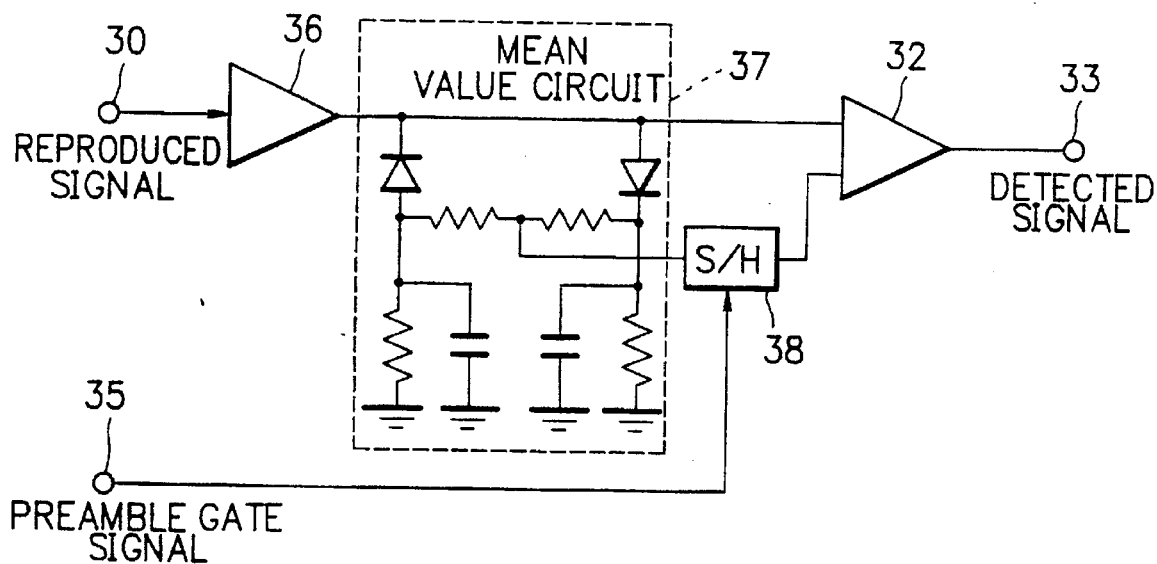
FIG. 4 is a block diagram showing structure of another example of the conventional apparatus.
Figure 5:
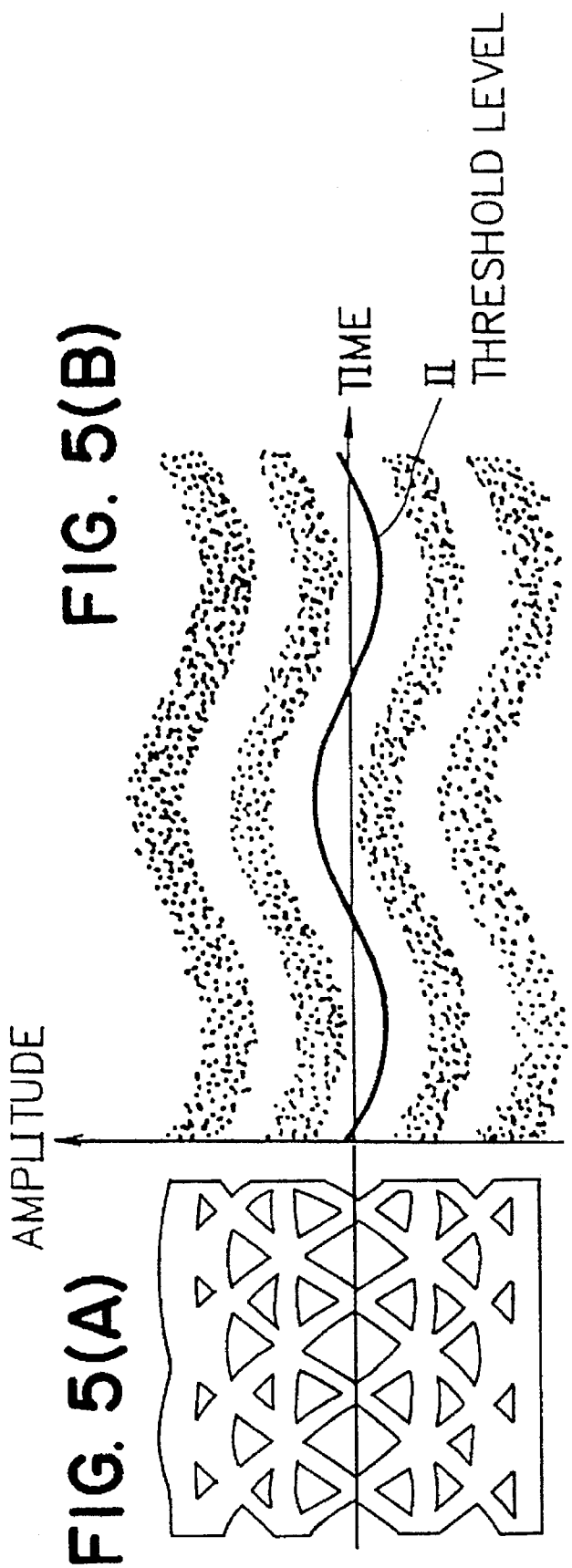
FIGS. 5(A)–5(B) are diagrams showing a relationship between a reproduction signal and a threshold level when the dc fluctuation is present.

From the sampling signals from the sample and hold circuit 1, the threshold level generator 3 extracts only ones at points of time when change point detection signals are received from the change point detector 4 and thereafter calculates a mean value thereof with respect to time to thereby create a threshold level. As indicated by a line II of (B) in FIG. 5, the threshold level varies according to an envelope of reproduced signal even when the envelope of all reproduced signals changes.

Furthermore, the threshold level is created by averaging with respect to time only the sampling signals at the points of time when change point detection signals are received from the change point detector 4. Consequently, when the resolution is decreased due to the increase in the recording density and there is inputted a reproduced signal of an eye pattern (FIG. 14) through the reproduction of a particular pattern including adc component, a total of two sampling points including the second and fourth sampling points relative to the left-most point (or a total of four sampling points ranging from the first to fourth sampling points) are selected from the sampling points denoted by circles in the diagram. The values of the selected sampling points are averaged with respect to time to generate an optimal threshold level designated by a line IV in the diagram.

Additionally, as shown by (A) and (C) in FIG. 15, even when the length of the record mark is shifted from the optimal value due to the recording power deviation and hence the eye patter of reproduced signals become asymmetric, since sampling signals in a portion of reproduced signal in which the amplitude takes a minimum value are averaged with respect to time by the threshold level generator 3 to resultantly obtain a threshold level, it is possible to attain threshold level respectively indicated by lines V and VII of (A) and (C) in FIG. 15. In this connection, for reproduced signals of a record pit related to an optimal recording power, the threshold level generator 3 can attain a threshold level as denoted by a line VI of (B) in FIG. 15, the level being similar to that obtained by the conventional apparatus.

The threshold level produced from the threshold level generator 3 is then fed back to the level sensor 2 of FIG. 6. Therefore, even when the envelope of all reproduced signals changes, there are attained from the level sensor 2 pulsated signals appropriately binarized according to the threshold level following the envelope.

Figure 14:
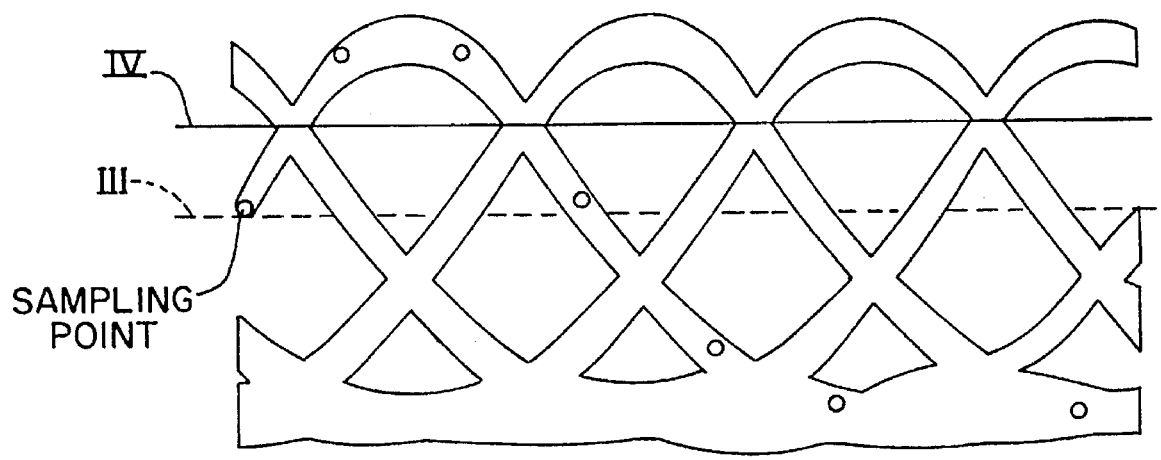
FIG. 14 is a diagram showing a threshold level for an offset in a particular pattern in accordance with the present invention and the prior art.

Moreover, in case where there is inputted reproduced signals successively including patterns associated with a dc component as shown in FIG. 14 or where there is supplied reproduced signals of which the eye pattern is asymmetric because the mark length is shifted from the optimal value due to the recording power fluctuation as shown in FIG. 15, an optimal threshold level is inputted to the threshold level generator. Resultantly, the generator 3 can produce pulsated signals appropriately binarized.

Figure 7:
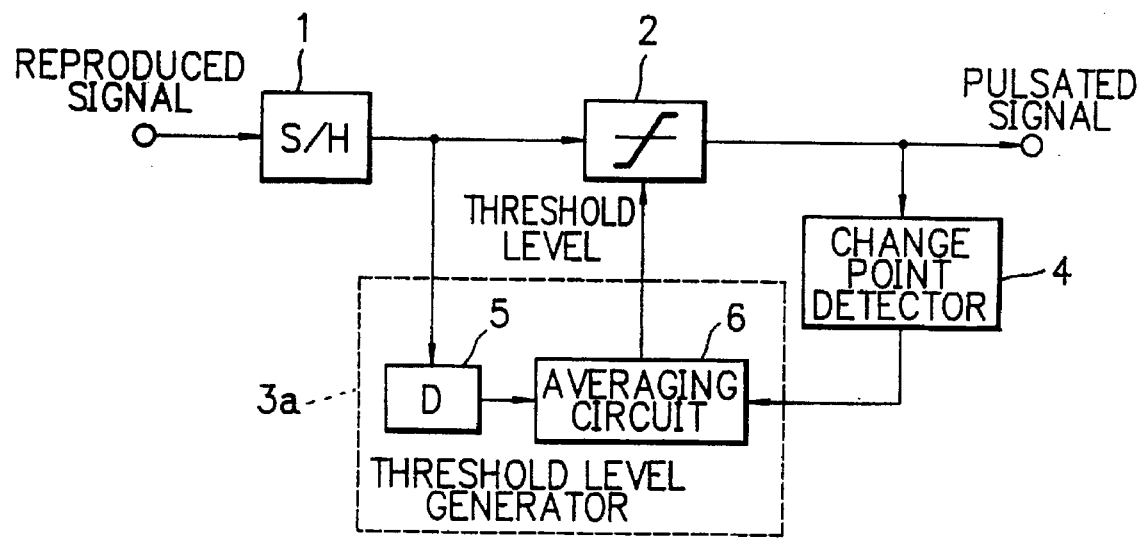
FIG. 7 is a block diagram showing structure of a second embodiment of the reproducing apparatus in accordance with the present invention.

Next, description will be given of a second embodiment of the reproducing apparatus in accordance with the present invention. FIG. 7 shows in a block diagram the configuration of the second embodiment. In the diagram, the same constituent components as those of FIG. 6 are assigned with the same reference numerals. As shown in FIG. 7, the second embodiment includes a threshold level generator circuit 3a equivalent to the threshold level generator 8 of FIG. 6, the circuit 3a including a delay circuit 5 and an averaging circuit 6.

Operation of the embodiment will be now described. A sampling signal created from the sample and hold circuit 1 is delayed through the delay circuit 5 by one sampling period of time and is thereafter fed to the averaging circuit 6. The delay circuit 5 is provided to adjust timing with respect to the detection of a change point position by the change point detector 4.

From the sampling signals from the delay circuit 5, the averaging circuit 6 extracts only ones at input points of time of change point detection signals attained by detecting positions before and after a change point by the change point detector 4 and then averages values of the extracted points to create a threshold level to be fed to the level sensor 2. In this embodiment, there is obtained an advantageous effect similar to that of the first embodiment.

Figure 8:
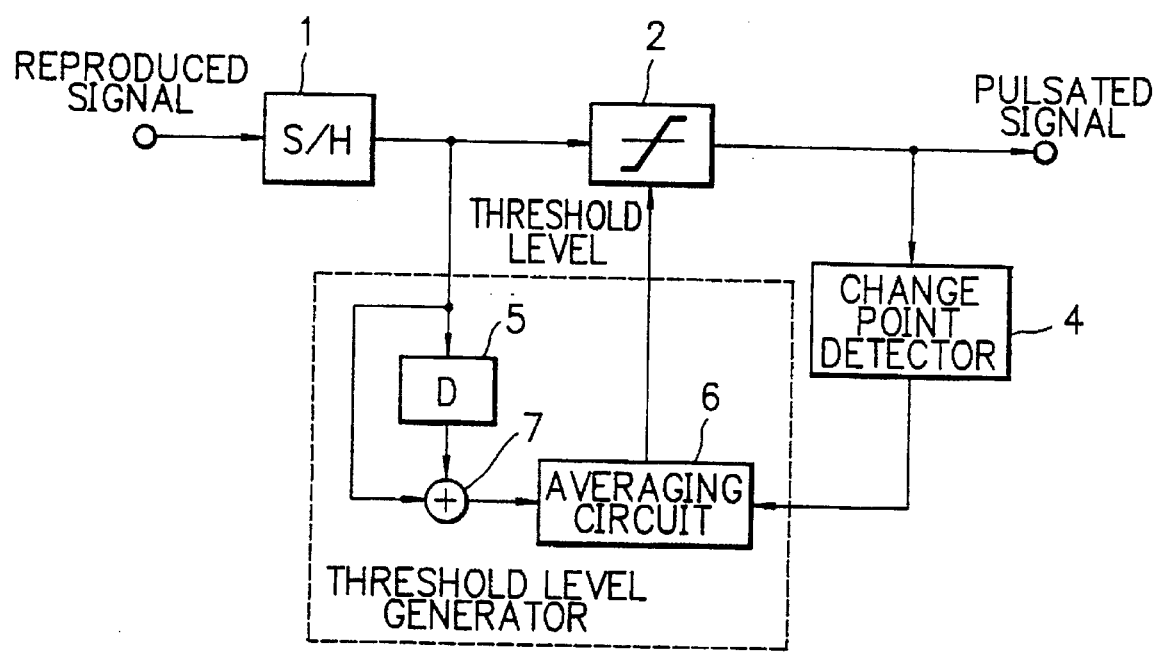
FIG. 8 is a block diagram showing the construction of a third embodiment of the reproducing apparatus in accordance with the present invention.

Subsequently, description will be given of a third embodiment of the reproducing apparatus in accordance with the present invention. FIG. 8 is a block diagram showing the configuration of the third embodiment. In this diagram, the same constituent components as those of FIG. 6 are assigned with the same reference numerals. As can be seen from FIG. 8, the third embodiment includes a threshold level generator circuit 3b equivalent to the threshold level generator 3 of FIG. 6. The circuit 3b includes a delay circuit 5, an adder circuit, 5, and an averaging circuit 6.

Operation of the third embodiment will be now described. A sampling signal created from the sample and hold circuit 1 is delayed through the delay circuit 5 for one sampling period of time and is then supplied to the adder 7. The delayed signal is added to the sampling signal which is not fed to the delay circuit 5 and which is directly inputted to the adder 7.

From the sampling signals from the adder circuit 7, the averaging circuit 6 extracts only ones at input points of time of change point detection signals attained by detecting change point positions by the change point detector 4 and then averages values of the extracted points with respect to time to produce a threshold level to be fed to the level sensor 2. In the third embodiment, there is also attained an advantageous similar to that of the first embodiment.

Figure 9:
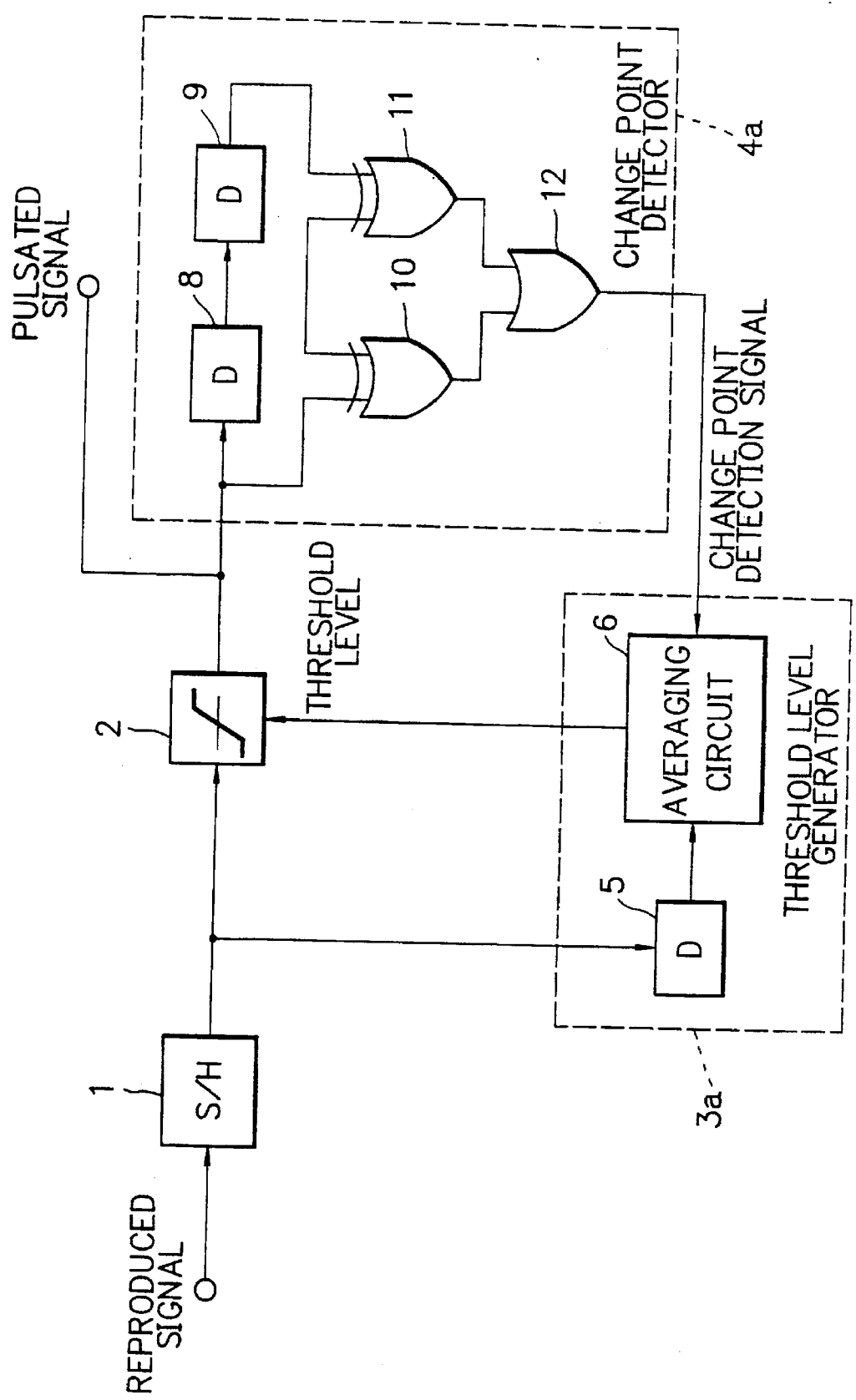
FIG. 9 is a block diagram showing the circuit configuration of a fourth embodiment of the reproducing apparatus in accordance with the present invention.

Next, description will be given of a fourth embodiment of the reproducing apparatus for optical information recording media in accordance with the present invention. FIG. 9 shows in a circuit diagram of the configuration of the fourth embodiment, In the diagram, the same constituent components as those of FIG. 7 are assigned with the same reference numerals. As shown in FIG. 9, the fourth embodiment includes a change point detecting circuit 4a equivalent to the change point detector 4 of FIG. 6. However, the circuit 4a includes delay circuits 8 and 9, two-input exclusive OR circuits 10 and 11, and a two-input OR circuit 12.

Operation of the embodiment will be now described. A pulsated signal from the level sensor 2 is fed to one of the input terminals of the exclusive OR circuit 10. On the other hand, the pulsated signal is delayed through the delay circuits 8 and 9 for two sampling periods of time to be fed to one of the input terminals the exclusive OR circuit 11. Moreover, the pulsated signal delayed through the delay circuit 8 for one sampling period of time is delivered to the remaining input terminals respectively of the exclusive OR circuits 10 and 11.

As a result, assuming that the pulsated signal outputted from the delay circuit 8 to be a signal at the current time, a high-level signal is outputted from the exclusive OR circuit 10 when the input value after one sampling period relative to the current point of time is changed from 0 to 1 or vice versa. On the other hand, a high-level signal is outputted from the exclusive OR circuit 11 when the input value before one sampling period relative to the current point of time is changed as above. Signals respectively outputted from the exclusive OR circuits 10 and 11 are ORed by the OR circuit 12 such that a resultant signal is supplied as a change point detection signal to the averaging circuit 6. In consequence, a change point detection signal before or after the change point position is outputted from the change point detector 4a. Also in the third embodiment, there is obtained an advantageous effect similar to that of the first embodiment.

Figure 10:
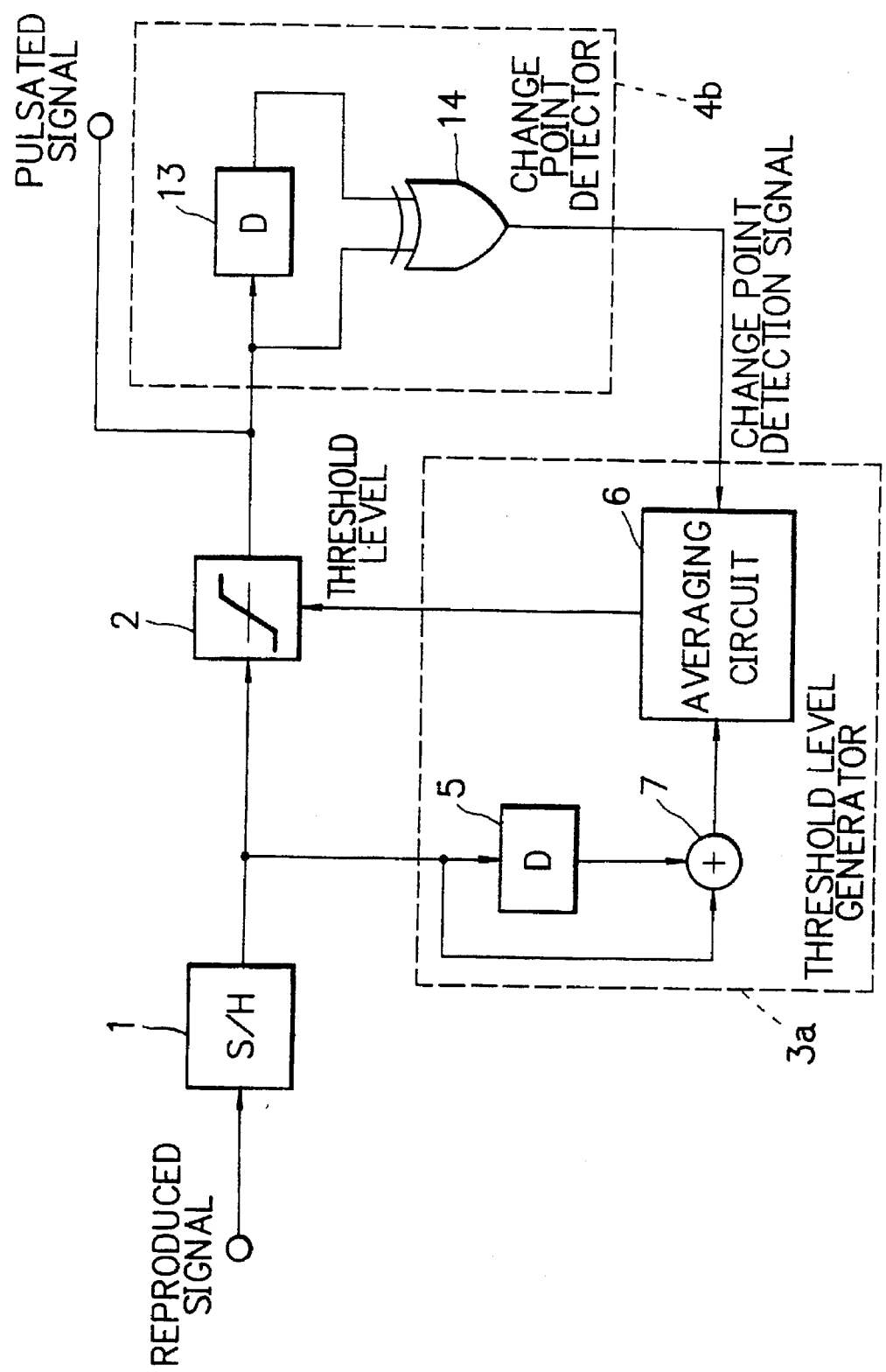
FIG. 10 is a block diagram showing the circuit structure of a fifth embodiment of the reproducing apparatus in accordance with the present invention.

Subsequently, description will be given of a fifth embodiment of the reproducing apparatus for optical information recording media in accordance with the present invention. FIG. 10 shows in a circuit diagram the construction of the fifth embodiment. In this diagram, the same constituent elements as those of FIG. 8 are assigned with the same reference numerals. As can be seen from FIG. 10, the fifth embodiment includes a change point detecting circuit 4b equivalent to the change point detector 4 of FIG. 6, the circuit 4b including a delay circuit 13 and a two-input exclusive OR circuit 14.

Operation of the fifth embodiment will be now described. A pulsated signal obtained from the level sensor 2 is supplied to one of the input terminals of the exclusive OR circuit 14. On the other hand, the pulsated signal is delayed through the delay circuit 13 for one sampling period of time and is then delivered to the other input terminal of the exclusive OR circuit 14.

As a result, a high-level signal is outputted from the exclusive OR circuit 14 when the pulsated signal at the current point of time is changed from 0 to 1 or vice versa in the input operation before one sampling period relative to the current point of time. When the signal from the exclusive OR circuit 14 is at a high level, the signal is supplied as a change point detection signal indicating the change point position to the averaging circuit 6. In the fifth embodiment, there is also attained an advantageous similar to those of the preceding embodiments.

Figure 11:
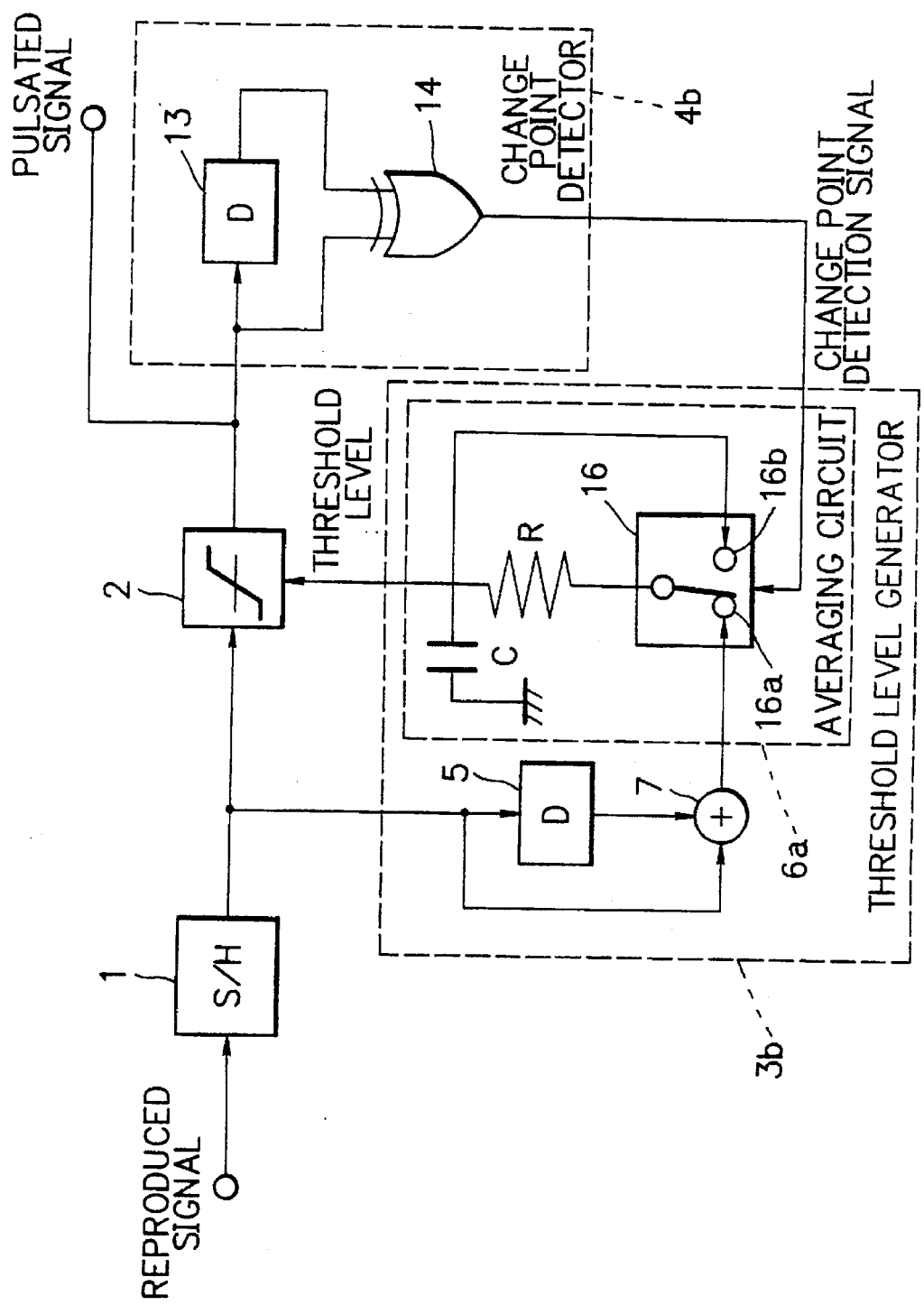
FIG. 11 is a block diagram showing the circuit configuration of a sixth embodiment of the reproducing apparatus in accordance with the present invention.

Next, description will be given of a sixth embodiment of the reproducing apparatus for optical information recording media in accordance with the present invention. FIG. 11 is a circuit diagram showing the construction of the sixth embodiment. In FIG. 11, the same constituent components as those of FIG. 10 are assigned with the same reference numerals. As shown in FIG. 11, the sixth embodiment includes an averaging circuit 6a equivalent to the averaging circuit 6 in the threshold level generator 3b of FIGS. 8 and 10. The circuit 6a includes an electronic control switch 16, a resistor R, and a capacitor C. The resistor and capacitor C constitute an integration circuit.

Operation of the fifth embodiment will be next described. The electronic control switch 16 is responsive to a change point detection signal, which is received from the exclusive OR circuit 14 and which indicates a change point position when the signal is in a high-level state, to select either one of a signal delivered from the adder 7 to an input terminal 16a of the switch 16 and a signal fed from the integration circuit to an input terminal 16b thereof.

That is, when a change point is detected, the switch 16 selects a sampling signal undergone an addition in the adder 7 and then outputs the signal therefrom. On the other hand, when a change point is missing, the switch 16 controls the output signal from the integration circuit to feed back thereto the output threshold level, thereby fixing the threshold value level.

The signal outputted from the switch 16 is integrated by the integration circuit and is then delivered as a threshold level to the level sensor 2. As a result, the averaging operation can be accomplished for the sampling signals of the change points. Also in the fifth embodiment, there is obtained an advantageous effect similar to those of the preceding embodiments.

Figure 12:
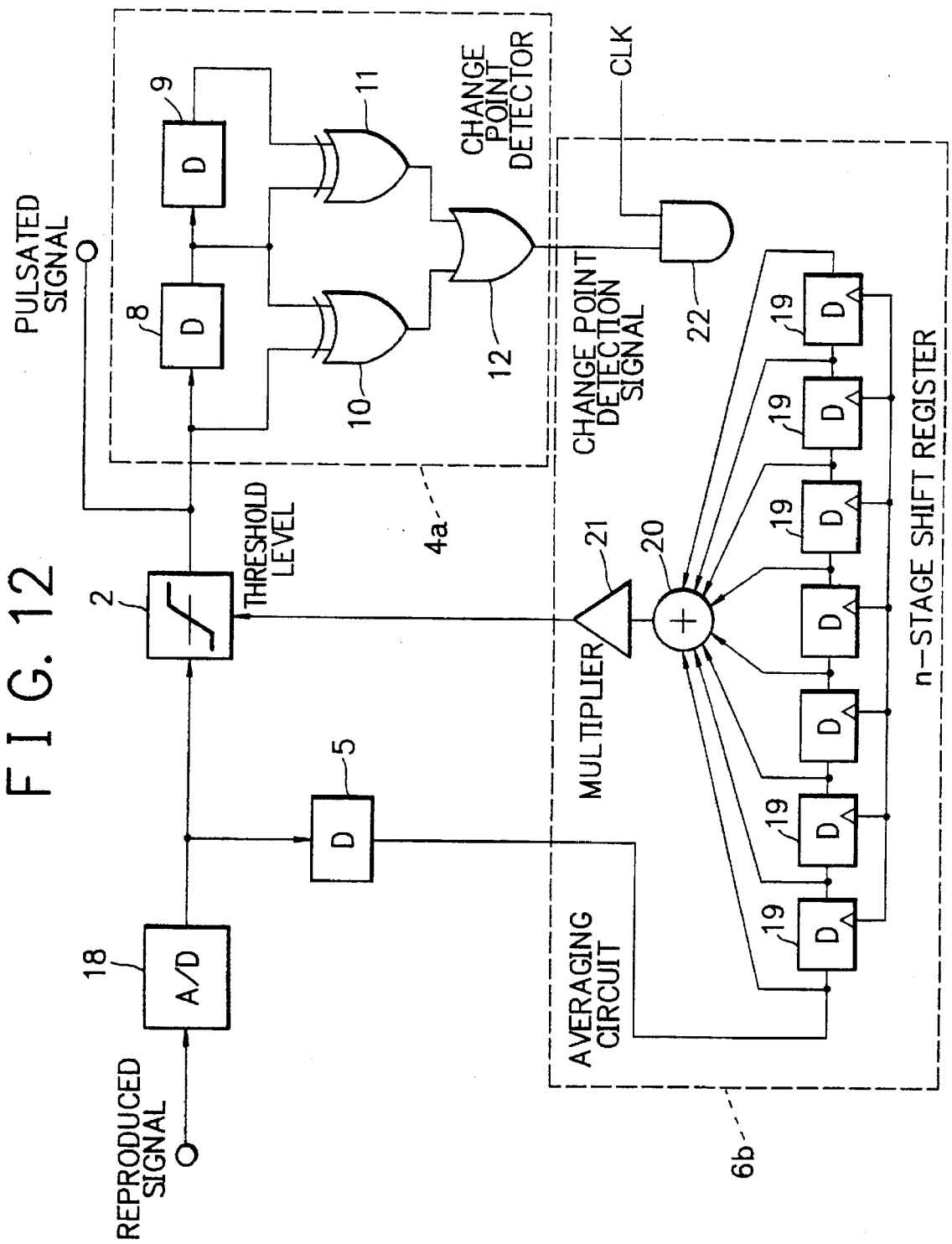
FIG. 12 is a block diagram showing the circuit construction of a seventh embodiment of the reproducing apparatus in accordance with the present invention.

Subsequently, description will be given of a seventh embodiment of the reproducing apparatus for optical information recording media in accordance with the present invention. FIG. 12 is a circuit diagram showing the construction of the seventh embodiment. In this diagram, the same constituent elements as those of FIG. 9 are assigned with the same reference numerals.

As shown in FIG. 12, the seventh embodiment includes an averaging circuit 6b equivalent to the averaging circuit 6 in the threshold level generator 3b of FIGS. 7 and 9. The circuit 6b includes an n-stage shift register including n delay circuits 19, an adder 20, a multiplying circuit (x 1/n) 21, and an AND circuit. Moreover, the sample and hold circuit 18 is constituted with an A/D converter 18 to digitalize the waveform sample value.

Operation of the fifth embodiment will be next described. A reproduced signal from the optical head is fed to the A/D converter 18 to be sampled and then converted into a digital sampling signal. The signal is then supplied to the level sensor 2 and delay circuit 5. The level sensor 2 includes a digital circuit to convert data having a depth of about eight bits into a binary level.

Serially supplied to the n-stage shift register is the digital sampling signal delayed through the delay circuit for one sample value. The register outputs the stored digital sampling signal in parallel to the adder 20. The digital sampling signal is averaged by a digital filter including the n-stage shift register and adder 20 and is then delivered to the multiplier 21 to be multiplied by 1/n. The result of multiplication is supplied as a threshold value to the level sensor 2.

In this situation, the n-stage shift register conducts the shift operation according to a signal obtained by ANDing by the AND circuit 22 the change point detection signal from the OR circuit 12 in the change point detector 4a and an external clock. Consequently, for each change point detection, sample values before and after the change point are stored and shifted in the n-stage shift register. As a result, the averaging operation can be accomplished for the sample values before and after the change point detection, and hence there is obtained an advantageous effect similar to those of the preceding embodiments.

Figure 13:
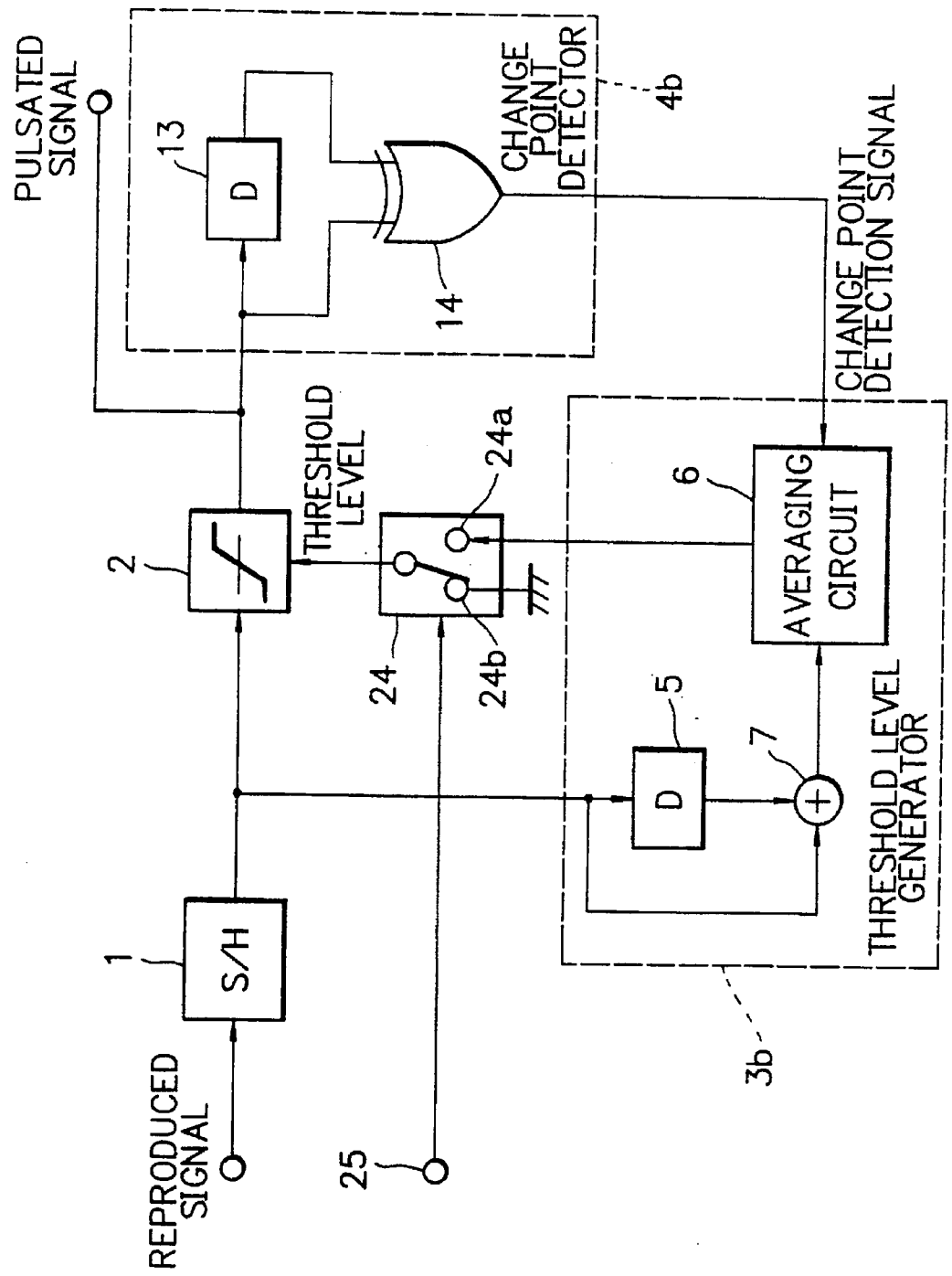
FIG. 13 is a block diagram showing the circuit constitution of an eighth embodiment of the reproducing apparatus in accordance with the present invention.

Next, description will be given of an eighth embodiment of the reproducing apparatus for optical information recording media in accordance with the present invention. FIG. 13 is a circuit diagram showing the construction of the eighth embodiment. In this diagram, the same constituent units as those of FIG. 10 are assigned with the same reference numerals.

As can be seen from FIG. 13, the eighth embodiment includes an electronic switch 24 between the threshold level generator 3b and level sensor 2 shown in FIGS. 8 and 10. The electronic control switch 24 is responsive to a threshold mode signal from a terminal 25 to select either one of the threshold level delivered from the averaging circuit 6 to a terminal 24a and a fixed value (at a ground level in this case) inputted to a terminal 24b.

In the eighth embodiment, it is assumed that preformatted areas and record areas have been beforehand formed on the opto-magnetic disk from which information is to be reproduced. In such an opto-magnetic disk, the reproduced signal level varies between the preformatted areas in which information is beforehand recorded as changes in contour of depression and projection and the record areas for which the recording and reproduction of information are conducted according to changes in the direction of magnetization. Consequently, when the area switching operation is achieved between the preformatted and record areas, the chance of error is increased immediately after the reproduction of information therein. It is therefore desirable to fix the threshold level during the reproduction of information in the preformatted area.

For this purpose, in the eighth embodiment, an identification (ID) signal in the preformatted area is reproduced to detect a pattern thereof so as to decide the first point of th ID signal, thereby producing a threshold value mode signal corresponding to the preformatted area having a predetermined length. The mode signal is delivered as a switching signal to the electronic control switch 24 such that the switch 24 is set to the side of a terminal 24b during the reproduction of the preformated area and to the side of a terminal 24a during the reproduction of the record area.

In this connection, the present invention is not restricted by the embodiments above but is applicable to other than the opto-electric disk, for example, to an optical disk on which information is recorded as changes in the contour of depression and projection and an optical disk in which information is recorded as changes in the state of phase. Additionally, the optical information recording media may be in other than the disk form, for example, in the form of a card.

In accordance with the present invention described above, only the sampling signals (sample points) before and after the change point of pulsated signals are extracted to attain a mean value thereof so as to thereby form a threshold level. The threshold level is compared with a reproduced signal to obtain a pulsated signal. Consequently, even when the envelope of all reproduced signal changes, the threshold level can follow the change of the envelope of the reproduced signals and hence the reproduced signals can be appropriately attained while reducing occurrences of errors.

Furthermore, in accordance with the present invention, an optimal threshold level can be generated also for a sequence of patterns including particular dc components. Moreover, such an optimal threshold level is obtainable for reproduced signals of which the eye pattern is asymmetric because the mark length is shifted from the optimal value due to the recording power deviation. In consequence, there can be appropriately attained the reproduced signals while minimizing errors.

In addition, when achieving a reproducing operation for an optical information recording media on which arbitrary information is recorded in record areas in the mark edge recording method and predetermined information is beforehand written in preformatted areas, since there is provided selector means for preventing an influence of the level difference between the reproduced signals respectively of the preformatted and record areas on the threshold level generation, it is possible to remarkably decrease the errors occurring immediately after the reproduction following a change-over operation between the preformatted and record areas. As above, in accordance with the present invention, the error rate can be considerably minimized as compared with the prior art, which hence remarkably contributes to improvement of reliability of the reproducing apparatus.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A reproducing apparatus for optical recording media, comprising:

a sample and hold circuit for sampling and holding a reproduced signal obtained by reproducing by an optical head information recorded on optical information recording media in a mark edge recording method;

a level sensor circuit for comparing a level of a sampling signal outputted from the sample and hold circuit with that of a threshold level and producing a binarized pulsated signal;

a change point detector circuit for receiving the pulsated signal as an input signal thereto, detecting a position of a change point where "0" or "1" of binary information changes respectively into "1" or "0", or positions before and after said change point, and generating a timing signal or timing signals showing the position of said change point or the positions before and after said change point as a change point detection signal or change point detection signals, respectively; and a threshold level generator circuit for receiving as input signals thereto the sampling signal outputted from the sample and hold circuit and the change point detection signal outputted from the change point detector circuit, extracting from the sampling signals only ones at points of time when the change point detection signal indicates detection of a change point, averaging the extracted sampling signals with respect to time to thereby create the threshold level, and outputting the threshold level to the level sensor circuit.

2. A reproducing apparatus for optical recording media in accordance with claim 1, wherein the threshold level generator circuit includes:

a delay circuit for delaying the output signal from the sample and hold circuit for a predetermined sampling period of time; and an averaging circuit for receiving as input signals thereto the delayed sampling signals outputted from the delay circuit and the change point detection signal outputted from the change point detector circuit, extracting from the delayed sampling signals only ones at points of time when the change point detection signal indicates detection of a change point, carrying out an averaging process for the extracted sampling signals with respect to time to thereby create the threshold level, and outputting the threshold level to the level sensor circuit.

3. A reproducing apparatus for optical recording media in accordance with claim 2, wherein the averaging circuit includes:

an n-stage shift register for receiving in a serial fashion the output signal from the delay circuit or the adder;

control means for activating the shift register to conduct a shift operation only when the change point detection signal indicates detection of a change point;

an assembling circuit for assembling a parallel output signal of the shift register; and a multiplier for multiplying the output signal from the assembling circuit by a predetermined constant and outputting a result of multiplication as the threshold level.

4. A reproducing apparatus for optical recording media in accordance with claim 2, wherein the change point detector circuit includes:

a first delay circuit and a second delay circuit each for delaying the pulsated signal from the level sensor circuit for one sampling period of time; and a logic circuit for conducting an OR operation between a first signal indicating matching/mismatching between input and output signals of the first delay circuit and a second signal indicating matching/mismatching between input and output signals of the second delay circuit and generating and outputting therefrom the change point detection signal.

5. A reproducing apparatus for optical recording media in accordance with claim 2, wherein the averaging circuit includes:

an electronic control switch responsive to the change point detection signal for selecting one of the output signal from the adder or delay circuit and the threshold level from the averaging circuit; and an integrating circuit for integrating the signal selected by the electronic control switch and outputting the signal as the threshold level to the level sensor circuit.

6. A reproducing apparatus for optical recording media in accordance with claim 1, wherein the threshold level generator circuit includes:

a delay circuit for delaying the output signal from the sample and hold circuit for a predetermined sampling period of time;

an adder for adding the delayed sampling signal outputted from the delay circuit to the output signal from the sample and hold circuit; and an averaging circuit for receiving as input signals thereto the signal outputted from the adder and the change point detection signal outputted from the change point detector circuit, extracting from the output signals from the adder only ones at points of time when the change point detection signal indicates detection of a change point, carrying out an averaging process for the extracted signals with respect to time to thereby create the threshold level, and outputting the threshold level to the level sensor circuit.

7. A reproducing apparatus for optical recording media in accordance with claim 6, wherein the averaging circuit includes:

an electronic control switch responsive to the change point detection signal for selecting one of the output signal from the adder or delay circuit and the threshold level from the averaging circuit; and an integrating circuit for integrating the signal selected by the electronic control switch and outputting the signal as the threshold level to the level sensor circuit.

8. A reproducing apparatus for optical recording media in accordance with claim 6, wherein the change point detector circuit includes:

a delay circuit for delaying the pulsated signal from the level sensor circuit for one sampling period of time; and a logic circuit for generating a signal indicating matching/mismatching of an output signal from the delay circuit and outputting the signal as the change point detection signal.

9. A reproducing apparatus for optical recording media in accordance with claim 6, wherein the averaging circuit includes:

an n-stage shift register for receiving in a serial fashion the output signal from the delay circuit or the adder;

control means for activating the shift register to conduct a shift operation only when the change point detection signal indicates detection of a change point;

an assembling circuit for assembling a parallel output signal of the shift register; and a multiplier for multiplying the output signal from the assembling circuit by a predetermined constant and outputting a result of multiplication as the threshold level.

10. A reproducing apparatus for optical recording media in accordance with claim 1, wherein the reproduced signal supplied to the sample and hold circuit is one attained by conducting a reproducing operation by an optical head for optical information recording media on which arbitrary information is recorded in record areas in the mark edge recording method and predetermined information is beforehand recorded in preformatted areas, the apparatus further including selector means between the threshold level generator circuit and the level sensor circuit for selecting a threshold level from the threshold level generator circuit during a reproducing operation of the record areas and selecting a predetermined fixed value as the threshold level during a reproducing operation of the preformatted areas.

* * * * *

UNITED STATES PATENT AND TRADEMARK OFFICE
CERTIFICATE OF CORRECTION

PATENT NO. : 5,961,713
DATED : October 5, 1999
INVENTOR(S) : Wijaranakula

It is certified that error appears in the above-identified patent and that said Letters Patent is hereby corrected as shown below:

Title page, item [56] References Cited, OTHER PUBLICATIONS, lines 6-7 "Bulk Microdefect Analyzers" should read --A Bulk Microdefect Analyzer--.

Signed and Sealed this

Fourteenth Day of March, 2000

Attest:

Attesting Officer

Q. TODD DICKINSON

Commissioner of Patents and Trademarks